US006610133B2

(12) United States Patent (10) Patent No.: US 6,610,133 B2
Campbell (45) Date of Patent: Aug. 26, 2003

(54) DISPERSIONS FOR USE IN INK JET INKS

(75) Inventor: Douglas R. Campbell, West Sand Lake, NY (US)

(73) Assignee: BASF Corporation, Southfield, MI (US)

( * ) Notice: Subject to any disclaimer, the term of this patent is extended or adjusted under 35 U.S.C. 154(b) by 37 days.

(21) Appl. No.: 09/742,780

(22) Filed: Dec. 20, 2000

(65) Prior Publication Data

US 2002/0073893 A1 Jun. 20, 2002

(51) Int. Cl.[7] .................................................. C09N 11/02
(52) U.S. Cl. ................ 106/31.86; 106/31.65; 106/31.89
(58) Field of Search ........................ 106/31.86, 31.65, 106/31.89

(56) References Cited

U.S. PATENT DOCUMENTS

| 3,844,994 | A | | 10/1974 | Vijendran et al. | ........ 260/22 R |
| 4,385,901 | A | | 5/1983 | Podder | ........ 8/527 |
| 4,689,078 | A | | 8/1987 | Koike et al. | ........ 106/22 |
| 5,266,622 | A | | 11/1993 | Mazanek et al. | ........ 524/131 |
| 5,431,723 | A | | 7/1995 | Bermes et al. | ........ 106/22 K |
| 5,531,816 | A | | 7/1996 | Wickramanayake | ...... 106/20 R |
| 5,725,647 | A | | 3/1998 | Carlson et al. | ........ 106/31.86 |
| 5,891,227 | A | | 4/1999 | Hoffmann et al. | ........ 106/31.28 |
| 5,900,899 | A | * | 5/1999 | Ichizawa et al. | ........ 106/31.86 |
| 6,077,339 | A | * | 6/2000 | Nyssen et al. | ........ 106/31.77 |
| 6,120,590 | A | * | 9/2000 | Miyamoto et al. | ........ 106/31.6 |
| 6,245,138 | B1 | * | 6/2001 | Nyssen et al. | ........ 106/31.86 |
| 6,248,163 | B1 | | 6/2001 | Martin | ........ 106/31.86 |
| 6,251,173 | B1 | * | 6/2001 | Holloway et al. | ........ 106/31.49 |
| 6,261,353 | B1 | * | 7/2001 | Doi et al. | ........ 106/31.6 |
| 6,294,592 | B1 | * | 9/2001 | Hermann et al. | ........ 106/31.6 |
| 6,478,866 | B1 | | 11/2002 | Nyssen et al. | ........ 106/503 |

FOREIGN PATENT DOCUMENTS

WO    WO 99/43759    2/1999    ........... C09D/11/00

OTHER PUBLICATIONS

USSN 09/623,151, entitled "Acrylic Resin Pigment Preparations" pp. 1–24 and Abstract.

* cited by examiner

*Primary Examiner*—Mark L. Bell
*Assistant Examiner*—Veronica F. Faison

(57) ABSTRACT

An aqueous ink offering good waterfastness, rub resistance, and stability suitable for use in ink jet printers, as writing inks, and in other printing inks includes a colorless aromatic sulfonic acid compound, at least one pigment, and a water-soluble polyol or polyether, particularly polyethylene glycol. Pigments are easily dispersed in the ink compositions of the invention and the ink compositions have excellent dispersion stability and bleed resistance.

27 Claims, No Drawings

DISPERSIONS FOR USE IN INK JET INKS

FIELD OF THE INVENTION

The present invention relates to aqueous inks, particularly ink jet inks and inks for writing instruments, having colorant dispersions with good color development and stability, and to methods of preparing such inks.

BACKGROUND OF THE INVENTION

The ink jet process involves directing droplets of an ink in a specific manner from one or more small nozzles onto a substrate, for example onto paper, wood, textiles, plastic or metal. Electronic control combines the individual droplets into script characters or graphic patterns. It is important in this process that the ink contain no particles large enough to block the nozzles through which it is directed.

In the past, aqueous ink jet inks have been colored using dyes that are dissolved in the ink and so cannot block the nozzles. For example, Bermes et al., U.S. Pat. No. 5,431,723, describes the preparation of liquid diazo dye preparations and their use in the water-based ink for the inkjet process. It has been found, however, that the inks described in U.S. Pat. No. 5,431,723 have substantial disadvantages, in particular poor water resistance and poor lightfastness.

Hoffmann et al., U.S. Pat. No. 5,891,227, provides aqueous dye preparations for preparing inks for the inkjet process, writing inks, or printing colors that have improved water resistance and lightfastness compared to the inks of the U.S. Pat. No. 5,431,723. The dye preparations described in U.S. Pat. No. 5,891,227 include aqueous dye preparations comprising, based on the weight of the preparation, from 0.1 to 15% by weight of a dye, with 90 to 100% of the dye being of the formula

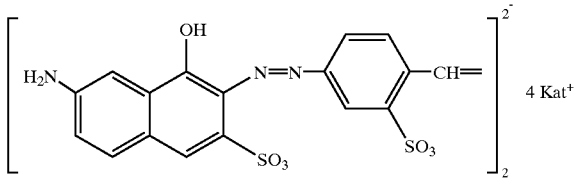

with the cation being a metal or ammonium ion; from 1 to 40% by weight of carbon black; and from 0.1 to 15% by weight of a polyethylene glycol. Particularly good results are obtained when the weight ratio of the carbon black to the dye in at least 6:1. While these inks provide good waterfastness, lightfastness, and rubfastness, the range of color that can be achieved is limited because of the high content of black dye and carbon black pigment.

It would be desirable to be able to formulate ink jet inks of any color that would not clog the ink jet nozzles and yet provide the good waterfastness, lightfastness, and rub resistance available with the inks formulated according to the Hoffman patent.

SUMMARY OF THE INVENTION

The invention provides an aqueous ink offering good waterfastness, rub resistance, and stability. The ink is suitable for use in ink jet printers, as writing inks, in other printing inks. The ink includes a colorless aromatic sulfonic acid compound, at least one pigment, and a water-soluble polyol or polyether, particularly polyethylene glycol.

The ink compositions of the invention have excellent dispersion stability and bleed resistance. The inks of the invention are useful as aqueous coating or printing inks, in particular as inks for the inkjet process or writing inks.

DETAILED DESCRIPTION OF THE INVENTION

The ink may be prepared by first preparing an aqueous ink base and then diluting the aqueous ink base with water or with mixtures of water and water-miscible organic solvents to obtain an ink of the desired strength or viscosity.

The ink base includes from about 0.1 to about 15% by weight of at least one colorless aromatic sulfonic acid compound. The term "colorless" is understood to mean that the compound does not have significant absorption in the visible light band (400 nm to 700 nm). In particular, it is desirable that the absorption in the visible light band be no more than about 1%.

Examples of suitable aromatic sulfonic acid compounds include, without limitation, β-naphthol, gamma acid (7-amino-1-hydroxynaphthalene-3-sulfonic acid), H-acid (8-amino-1-hydroxynaphthalene-3,6-disulfonic acid), I-acid, J-acid (2-amino-5-naphthol-7-sulfonic acid), di-J acid (bis-(5,5'-diydroxy-2,2'-naphthyl)amine-7,7'-disulfonic acid), 2-hydroxy-3-methylbenzoic acid, Tobias acid (2-naphthylamine-1-sulfonic acid), and so on.

Also suitable are aromatic compounds having one or more amine groups and one or more sulfonic acid groups. The aromatic amino sulfonic acid compounds may have one aromatic ring or multiple aromatic rings. When the aromatic amino sulfonic acid compound has multiple aromatic rings, the aromatic rings can be fused or bridged. Examples of bridged aromatic rings include, without limitation, those bridged by an alkylene group (e.g., methylene or isopropylene) or by an amine group. In addition to the amine and sulfonic acid groups, the aromatic amino sulfonic acid compound can have other substituents, including, without limitation, alkyl groups and hydroxyl groups. Examples of suitable aromatic amino sulfonic acids include, without limitation, diamino stilbene disulfonic acids, including 4,4'-diaminostilbene-2,2'-disulfonic acid compounds; sulfanilic acid; amino benzene sulfonic acids, such as 1-amino-2-methyl-4-benzenesulfonic acid; amino-azobenzene sulfonic acids, such as 4-amino-azobenzene-4'-sulfonic acid; and so on.

The ink composition further includes one or more pigments. For pigments used in ink jet ink, the pigment particle size should be from about 10 nanometers to about 500 nanometers. The aromatic sulfonic acid compound forms a stable dispersion of the pigments and avoids pigment agglomeration that would lead to clogged nozzles or a decrease in color strength. The aromatic sulfonic acid compound improves the ease with which the pigment is dispersed.

Examples of suitable classes of organic pigments include, without limitation, metallized and non-metallized azo pigments, azomethine pigments, methine pigments, anthraquinone pigments, phthalocyanine pigments, perinone pigments, perylene pigments, diketopyrrolopyrrole pigments, thioindigo pigments, iminoisoindoline pigments, iminoisoindolinone pigments, quinacridone pigments such as quinacridone reds and violets, flavanthrone pigments, indanthrone pigments, anthrapyrimidine pigments, carbazole pigments, monoarylide and diarylide yellows and oranges, benzimidazolone yellows, tolyl orange, naphthol orange, quinophthalone pigments, lithol rubines and so on. Specific examples of useful color pigments include, without limitation, quinacridone pigments, such as C.I. Pigment Red 202, C.I. Pigment Violet 19, and C.I. Pigment Red 122; perylene pigments, such as C.I. Pigment Red 179; azo pigments, such as C.I. Pigment Red 170, C.I. Pigment Red 144, and C.I. Pigment Brown 23; isoindolinone pigments, such as C.I. Pigment Orange 61, C.I. Pigment Yellow 109, and C.I. Pigment Yellow 110; diketopyrrolopyrrole pigments, such as C.I. Pigment Red 254, C.I. Pigment Red 255, C.I. Pigment Red 264, C.I. Pigment Orange 71, and C.I. Pigment Orange 73; copper phthalocyanine pigments such as C.I. Pigment Blue 15; and anthraquinone pigments, such as C.I. Pigment Blue 60, C.I. Pigment Red 177, C.I. Pigment Yellow 138, and C.I. Pigment Yellow 147.

Examples of suitable inorganic pigments include, without limitation, titanium dioxide, carbon black, iron oxides including red iron oxide, black iron oxide, and brown iron oxide, chromium oxide green, ferric ferrocyanide (Prussian blue), ultramarine, lead chromate, and so on.

The ink base may include from about 1 to about 80% by weight of one or more pigments. The amount of pigment used depends upon the nature of the pigments. Carbon black and certain organic pigments typically are used in the ink base in amounts of up to about 60% by weight, based on the weight of the ink base, while other pigments typically may be used in amounts of up to 40% by weight of the pigment base.

The ink base may optionally further include one or more dyes. Preferably, however, no dye is included because of poor water resistance. If included, there may be from about 1 to about 5% dye by weight, based on the weight of the pigment of the ink base. Examples of suitable dyes include, without limitation, C.I. Acid Yellow 23 (19 140), C.I. Acid Blue 9 (42 090), C.I. Direct Red 254, C.I. Direct Blue 86 (74 180), C.I. Reactive Red 24, C.I. Reactive Blue 49, C.I. Reactive Red 72 or the dye-acid of the reaction product of tetrazotized flavonic acid with 1-amino-8-hydroxynaphthalene-3,6-disulfonic acid or 2-hydroxy-3-methylbenzoic acid in each case in a molar ratio of 1:2. The dye preparations of this invention should be essentially free from foreign salts. This means for the purposes of the present invention that they may additionally include minor amounts, for example from 0 to 10% by weight, preferably from 0 to 5% by weight, in particular approaching 0% by weight, based on the weight of the preparation, of foreign salts.

The ink base also includes at least one water soluble compound selected from polyols and polyether compounds, especially polyethylene glycol compounds. Polyether compounds for the purposes of this invention are understood to include ethoxylated and/or propoxylated ethylenediamine. Other examples of useful water soluble compounds include water soluble diols and triols such as ethylene glycol and its oligomers such as diethylene glycol and triethylene glycol, propylene glycol and dipropylene glycol, glycerine, polyethylene glycol-polypropylene glycol block copolymers, the reaction products of ethylene oxide and primary amines, and the reaction products of bisphenol A with primary amines. The preferred polyethylene glycol has a weight average molecular weight of preferably at least about 300, more preferably at least about 1000, and particularly preferably at least about 2000. Additionally, the polyethylene glycol has a weight average molecular weight of preferably up to about 9000, more preferably up to about 6000, and particularly preferably up to about 4000. The polyethylene glycol preferably has a weight average molecular weight of from about 300 to about 9000, more preferably from about 1000 to about 6000, and still more preferably from about 2000 to about 4000.

The ink base preferably includes at least about 0.1% by weight, more preferably at least about 0.8% by weight of at least one water soluble polyol or polyether compound, particularly preferably of a polyethylene glycol compound. Additionally, the ink preferably includes up to about 15% by weight, more preferably up to about 6% by weight, still more preferably up to about 5% by weight of the at least one water-soluble polyol or polyether compound, particularly polyethylene glycol compound. The ink base includes from about 0.1 to about 15% by weight, preferably from about 0.1 to about 6% by weight, in particular from about 0.8 to about 5% by weight, based on the weight of the ink base, of the at least one water-soluble polyether or polyol compound, especially of a polyethylene glycol compound.

The ink base may further include a polypropylene glycol compound. The polypropylene glycol preferably has a weight average molecular weight of from about 400 to about 1000, more preferably from about 500 to about 700. When the ink bases of this invention include propylene glycol, the propylene glycol content will generally be within the range from about 0.1 to about 15% by weight, preferably within the range from about 0.1 to about 6% by weight, based on the weight of the ink base.

The balance to 100% by weight of the ink base is generally water.

The preferred weight ratio of the pigment to the aromatic sulfonic acid compound in the ink base and ink or coating composition depends upon the particular pigment or pigments and the sulfonic acid compound used. Important factors may include the surface area of the pigment, the surface chemistry of the pigment, the number of sulfonic acid groups of the aromatic sulfonic acid compound, and the molecular weight of the sulfonic acid compound. In one preferred embodiment 20 parts by weight of the aromatic sulfonic acid compound is used to 80 parts by weight of pigment. More typically, the weight ratio of the from aromatic sulfonic acid compound to the pigment will be from about 2:98 to about 8:92.

The inks of the invention are useful as aqueous coating or printing inks, in particular as inks for the inkjet process or writing inks. Such inks are obtained by diluting the aqueous ink bases of this invention with water or with mixtures of water and water-miscible organic solvents. Examples of suitable water-miscible organic solvents are $C_1$ to $C_4$ alkanols, such as methanol, ethanol, propanol, isopropanol, butanol, isobutanol, sec-butanol or tert-butanol; carboxamides, such as N,N-dimethylformamide or N,N-dimethylacetamide; lactams, such as ε-caprolactam; 2-pyrrolidinone or N-methyl-2-pyrollidinone; urea, cyclic ureas, such as 1,3-dimethyl-2-imidazolidinone or 1,3-dimethyl-2-hexahydropyrimidone; ketones or ketoalcohols, such as acetone, methyl ethyl ketone or 2-methyl-2-hydroxy-4-pentanone; ethers, such as tetrahydrofuran or dioxane; mono-, oligo- or polyalkylene glycols or thioglycols containing $C_2$–$C_6$-alkylene units, such as ethylene glycol, 1,2- or 1,3-propylene glycol, 1,2- or 1,4-butylene glycol, 1,6-hexanediol, diethylene glycol, triethylene glycol, dipropylene glycol, thiodiglycol, polyethylene glycol or polypropylene glycol; other polyols, such as glycerol or 1,2,6-hexanetriol; $C_1$–$C_4$-alkyl ethers of polyhydric alcohols, such as ethylene glycol monomethyl or monoethyl ether, diethylene glycol monomethyl or monoethyl ether or triethylene glycol monomethyl or monoethyl ether; γ-butyrolactone, or dimethyl sulfoxide. Examples of preferred water-miscible organic solvents are 2-pyrrolidinone, N-methyl-2-pyrrolidinone, mono-, di- or trialkylene glycols containing $C_2$–$C_6$-alkylene units, especially mono-, di- or triethylene glycol or dipropylene glycol, or dimethyl sulfoxide. Very particular emphasis is given to N-methyl-2-pyrrolidinone, diethylene glycol or dimethyl sulfoxide.

An aqueous coating or printing ink may obtained by diluting the ink base with a $C_1$ to $C_4$ alkanol, with or without further addition of water, and optionally with addition of further binders.

The inks or coating or printing colors of this invention in general include from about 2 to about 50% by weight, preferably from about 15 to about 30% by weight, based on the weight of the ink or color, of an ink base of this invention.

The inks or coating or printing colors of this invention may in general further include from about 75 to about 98% by weight, preferably from about 80 to about 95% by weight, in particular from about 86 to about 93% by weight, based on the weight of the ink or color, of water.

The inks of this invention in general include up to about 30% by weight, preferably up to about 5 to about 15% by weight, based on the weight of the ink, of one or more water-miscible organic solvents.

The coating or printing colors of this invention in general includes from about 1 to about 70% by weight, preferably from about 10 to about 30% by weight, based on the weight of the coating or printing color, of $C_1$–$C_4$-alkanol.

Further possible constituents of the inks or coating or printing colors of this invention are, for example and without limitation, anionic, cationic or nonionic surfactants, biocide such as fungicides and bactericides, corrosion inhibitors, humectants, perfume oils, and combinations of these. The proportion of these components is generally up to about 10% by weight, preferably up to about 5% by weight, based on the weight of the ink or coating. The inks or coatings of this invention are notable for high water resistance and light-fastness in use. The ink bases of this invention are likewise useful in marker fluids in writing implements, in aqueous liquid toners or in coating compositions, for example wood stain, ink ribbon colors, stamp-pad inks or ball pen pastes. They are also useful for pulp-coloring paper.

The invention is further described in the following examples. The examples are merely illustrative and do not in any way limit the scope of the invention as described and claimed. All parts are by weight unless otherwise indicated.

EXAMPLE 1

A mixture of 40 parts by weight of carbon black pigment, 18 parts by weight of J-Acid (10% solution, pH adjusted to 7.0 with triethanolamine), 137 parts by weight of water, 4 parts by weight of PLURACOL® E4000 (available from BASF Corporation), 1 part by weight of a biocide (about 95% by weight active), a couple drops of defoamer, and 400 parts by weight of 1.0 mm glass beads was allowed to grind for 24 hours. The resulting material was filtered through a 30 micron-pore filter paper and then through a 20–25 micron pore filter paper. 10 parts by weight of the filtered material was combined with 4 parts by weight of N-methyl-2-pyrrolidinone and 26 parts by weight of water to make an ink jet ink. The ink jet ink was filter through a 1 micron filter and printed on an ink jet printer. The print quality was good.

The ink was tested for bleeding in water, rub resistance, and resistance to highlight marker. For the bleed test, a test pattern of four one-inch squares surrounded by an unprinted area was printed on a sheet. The test pattern was dried under ambient conditions for one hour, then cut from the sheet. The optical density of the printed squares was measured. The test pattern was then immersed in water for five minutes, removed from the water, and air dried. The optical density was measured again. The difference between the initial density and the density after the water soak was less than 5%, indicating that the print did not bleed.

The same test pattern was printed and tested on a Sutherland Rub Tester for 10 cycles. The degree of color transfer and smudging was then visually evaluated. The printed test pattern had excellent rub resistance.

Finally, the ink was tested for resistance to marker ink. An alphanumeric character set on one line was printed and air dried for one hour. A commercially-available yellow highlighter marker was wiped over the text and the text was evaluated for smearing. The printed text did not smear.

EXAMPLE 2

A mixture of 20 parts by weight of carbon black pigment, 9 parts by weight of Gamma-Acid (10% solution, pH adjusted to 7.0 with triethanolamine), 68.5 parts by weight of water, 2 parts by weight of PLURACOL® E4000 (available from BASF Corporation), 0.5 part by weight of a biocide (about 95% by weight active), one drop of defoamer, and 400 parts by weight of 1.0 mm glass beads was allowed to grind for 24 hours. The resulting material was filtered through a 30 micron-pore filter paper and then through a 20–25 micron pore filter paper. 25 parts by weight of the filtered material was combined with 10 parts by weight of N-methyl-2-pyrrolidinone and 65 parts by weight of water to make an ink jet ink. The ink jet ink was filter through a 1 micron filter and printed on an ink jet printer. The print quality was good. The print did not bleed when tested using the bleed test described in Example 1.

The invention has been described in detail with reference to preferred embodiments thereof. It should be understood, however, that variations and modifications can be made within the spirit and scope of the invention.

What is claimed is:

1. An aqueous ink composition, comprising
   A. a material comprising at least one of a colorless aromatic sulfonic acid compound, β-naphthol, and 2-hydroxy-3-methylbenzoic acid,
   B. a pigment, and
   C. a water-soluble compound comprising at least one of a polyol and a polyether, wherein when the water-soluble compound consists of the polyol, the material is selected from the group consisting of β-naphthol, gamma acid, H-acid, J-acid, di-J acid, 2-hydroxy-3-methylbenzoic acid, Tobias acid, diamino stilbene disulfonic acids, sulfanilic acid, amino benzene sulfonic acids, amino-azobenzene sulfonic acids, and combinations thereof.

2. An ink composition according to claim 1, comprising:
   from about 0.1 to about 15 parts by weight of the material,
   from about 1 to about 80 parts by weight of the pigment, and
   at least about 0.1 part by weight of the water soluble compound.

3. An ink composition according to claim 1, wherein the material is selected from the group consisting of β-naphthol, gamma acid, H-acid, I-acid, di-J acid, 2-hydroxy-3-methylbenzoic acid, Tobias acid, diamino stilbene disulfonic acids, sulfanilic acid, amino benzene sulfonic acids, amino-azobenzene sulfonic acids, and combinations thereof.

4. An ink composition according to claim 1, wherein the pigment has a particle size from about 10 nanometers to about 500 nanometers.

5. An ink composition according to claim 1, wherein the water-soluble compound comprises a polyether compound.

6. An ink composition according to claim 1, wherein the water-soluble compound comprises a polyethylene glycol compound.

7. An ink composition according to claim 6, wherein the polyethylene glycol compound has a weight average molecular weight of at least about 300.

8. An ink composition according to claim 6, wherein the polyethylene glycol compound has a weight average molecular weight of up to about 9000.

9. An ink composition according to claim 6, wherein the polyethylene glycol compound has a weight average molecular weight from about 2000 to about 4000.

10. An ink composition according to claim 1, comprising:
from about 0.1 to about 15 parts by weight of the material,
from about 1 to about 60 parts by weight of the pigment, and
from about 0.8 to about 5 parts by weight of the water soluble compound.

11. An ink composition according to claim 1, wherein the weight ratio of the pigment to the material is from about 98:2 to about 80:20.

12. An ink composition according to claim 1, wherein the weight ratio of the pigment to the material is from about 98:2 to about 92:8.

13. An ink composition according to claim 1, wherein the ink composition is an ink jet ink.

14. An ink composition according to claim 1, wherein the ink composition is a writing ink.

15. An aqueous ink jet ink, comprising i) from about 2 to about 50% by weight of the aqueous ink jet ink of an ink base, ii) water, and iii) optionally a water-miscible organic solvent,
wherein the ink base comprises:
from about 0.1 to about 15 parts by weight of a material comprising at least one of a colorless aromatic sulfonic acid compound, β-naphthol, and 2-hydroxy-3-methylbenzoic acid,
from about 1 to about 80 parts by weight of a pigment having a particle size from about 10 nanometers to about 500 nanometers, and
at least about 0.1 part by weight of a water soluble compound comprising at least one of a polyol and a polyether, wherein when the water-soluble compound consists of the polyol, the materiel is selected from the group consisting of β-naphthol, gamma acid, H-acid J-acid, di-J acid, 2-hydroxy-3-methylbenzoic acid, Tobias acid, diamino stilbene disulfonic acids, sulfanilic acid, amino benzene sulfonic acids, amino-azobenzene sulfonic acids, and combinations thereof.

16. An aqueous ink jet ink according to claim 15, wherein the ink base is present in the aqueous ink jet ink in an amount from about 15% to about 30% by weight of the aqueous ink jet ink.

17. An aqueous ink jet ink according to claim 15, wherein the water-soluble compound comprises a polyethylene glycol compound having a weight average molecular weight of from about 300 to about 9000.

18. An aqueous ink jet ink according to claim 17, wherein the polyethylene glycol compound has a weight average molecular weight of from about 2000 to about 4000.

19. An aqueous ink jet ink according to claim 15, wherein the ink base comprises:
from about 0.1 to about 15 parts by weight of the material,
from about 1 to about 60 parts by weight of the pigment, and
from about 0.8 to about 5 parts by weight of the water soluble compound.

20. An aqueous ink jet ink according to claim 15, wherein the weight ratio of the pigment to the material is from about 98:2 to about 92:8.

21. A method of preparing an ink, comprising the steps of:
(a) preparing an ink base comprising
from about 0.1 to about 15 parts by weight of a material comprising at least one of a colorless aromatic sulfonic acid compound, naphthol, and 2-hydroxy-3-methylbenzoic acid,
ii. from about 1 to about 80 parts by weight of a pigment having a particle size from about 10 nanometers to about 500 nanometers, and
iii. at least about 0.1 part by weight of a water-soluble compound comprising at least one of a polyol and a polyether, wherein when the water-soluble compound consists of the polyol, the material is selected from the group consisting of β-naphthol, gamma acid, H-acid, J-acid, di-J acid, 2-hydroxy-3-methylbenzoic acid, Tobias acid, diamino stilbene disulfonic acids, sulfanilic acid, amino benzene sulfonic acids, amino-azobenzene sulfonic acids, and combinations thereof; and
(b) combining the ink base with at least one member selected from the group consisting of water and water-miscible organic solvents to form an ink, wherein the ink base is from about 2 to about 50% by weight of ink.

22. A method of improving the waterfastness of an ink jet ink, comprising steps of:
A. dispersing a pigment in water in the presence of i) a material comprising at least one of a colorless aromatic sulfonic acid compound, β-naphthol, and 2-hydroxy-3-methylbenzoic acid, and ii) a water-soluble compound comprising at least one of a polyol and a polyether, wherein when the water-soluble compound consists of the polyol, the material is selected from the group consisting of β-naphthol, gamma acid, H-acid, J-acid, di-J acid, 2-hydroxy-3-methylbenzoic acid, Tobias acid, diamino stilbene disulfonic acids, sulfanilic acid, amino benzene sulfonic acids, amino-azobenzene sulfonic acids, and combinations thereof: and
B. preparing an ink using the dispersed pigment.

23. A method according to claim 22, wherein the water-soluble compound comprises a polyethylene glycol compound having a weight average molecular weight of from about 300 to about 9000.

24. A method according to claim 22, wherein the weight ratio of the pigment to the material is from about 98:2 to about 92:8.

25. A method of improving the dispersion stability of a pigment in an aqueous ink, comprising steps of:
dispersing the pigment in water in the presence of i) a material comprising at least one of a colorless aromatic sulfonic acid compound, β-naphthol, and 2-hydroxy-3-methylbenzoic acid, and ii) a water-soluble compound comprising at least one of a polyol and a polyether, wherein when the water-soluble compound consists of the polyol, the material is selected from the group consisting of β-naphthol, gamma acid, H-acid, J-acid, di-J acid, 2-hydroxy-3-methylbenzoic acid, Tobias acid, diamino stilbene disulfonic acids, sulfanilic acid, amino benzene sulfonic acids, amino-azobenzene sulfonic acids, and combinations thereof.

26. A method according to claim 25, wherein the water-soluble compound comprises a polyethylene glycol compound having a weight average molecular weight of from about 300 to about 9000.

27. A method according to claim 25, wherein the weight ratio of the pigment to the material is from about 98:2 to about 92:8.

* * * * *